No. 759,220. PATENTED MAY 3, 1904.
L. E. PORTER.
METHOD OF TREATING COPPER BEARING ORES WITH CYANID SOLUTIONS.
APPLICATION FILED DEC. 29, 1902.
NO MODEL.

Witnesses
Inventor
Lewis E. Porter

No. 759,220. Patented May 3, 1904.

UNITED STATES PATENT OFFICE.

LEWIS E. PORTER, OF LOS ANGELES, CALIFORNIA, ASSIGNOR OF ONE-HALF TO JOHN J. SEEMAN, OF BARSTOW, CALIFORNIA.

METHOD OF TREATING COPPER-BEARING ORES WITH CYANID SOLUTIONS.

SPECIFICATION forming part of Letters Patent No. 759,220, dated May 3, 1904.

Application filed December 29, 1902. Serial No. 137,017. (No specimens.)

*To all whom it may concern:*

Be it known that I, LEWIS E. PORTER, a citizen of the United States, residing at Los Angeles, in the county of Los Angeles and State of California, have invented and discovered a new and useful Method of Treating Cupreous Ores with Cyanid Solution, of which the following is a specification.

An object of this invention is to increase the scope of the cyanid process and to make it possible to profitably treat ores which heretofore were practically valueless.

An object of this invention is economy— first, by a saving of the cyanid; second, by producing the copper as metallic copper by a single treatment of the ores.

I will now describe my newly-invented process, referring to the accompanying drawings, which show apparatus adapted for use in carrying out my invention and discovery.

Figure 1:
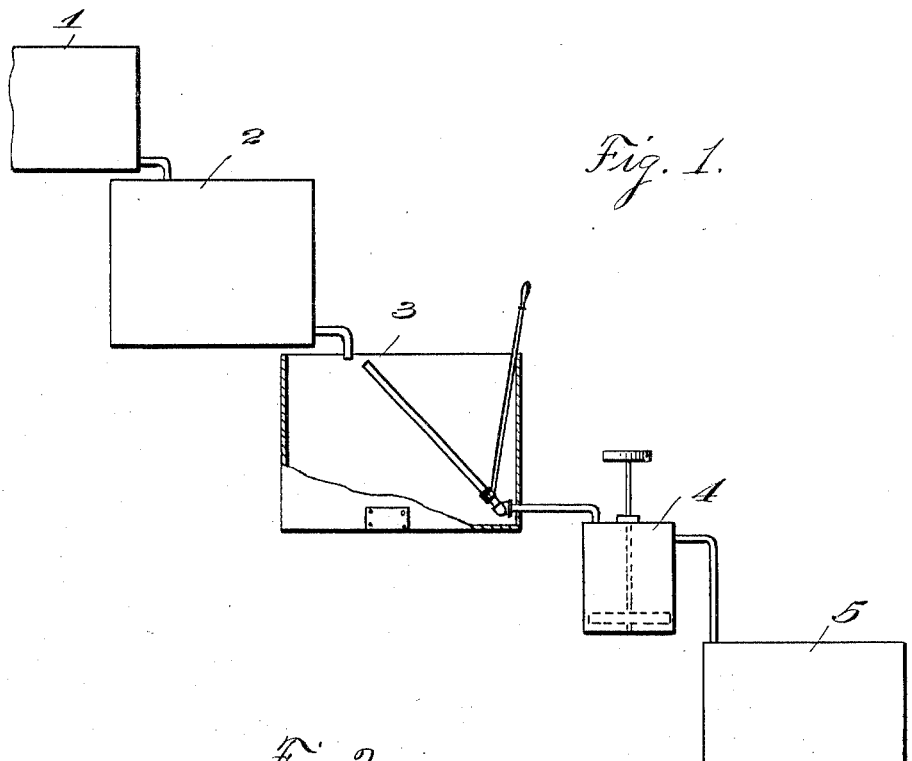
Figure 2:
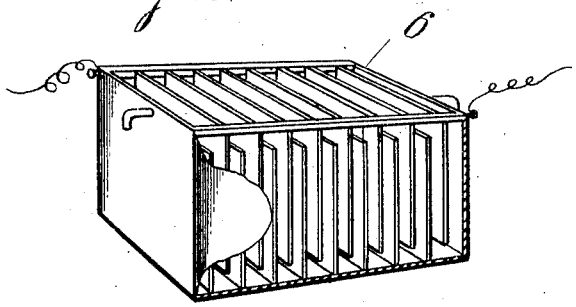

Figure 1 is a side elevation of a series of vats or receptacles arranged for carrying out my invention, and Fig. 2 is a broken perspective view of a vat or receptacle used for one of the steps in my method.

This process is carried on by first subjecting the ore in the usual way to the action of the usual alkaline cyanid solution, thereby dissolving the metals, as gold, silver, copper, &c., which are soluble in said solution; second, treating the resultant solution with acid, and thereby producing copper cyanid precipitate and hydrocyanic acid; third, separating the solution containing hydrocyanic acid from the copper precipitate; fourth, neutralizing said hydrocyanic-acid solution with an alkaline oxid, as caustic soda, caustic lime, or caustic potash, thereby producing an alkaline cyanid solution suitable for the repetition of the hereinbefore-described process; fifth, mixing the cyanid copper precipitate with an alkaline solution and then treating such mixture by electrolysis, and thereby depositing metallic copper and producing an alkaline cyanid solution which is suitable for the further treatment of ores in the usual manner hereinbefore specified.

In the practical working of this process the cyanid solution with which the crushed ore is treated is kept strong enough to dissolve all of the metals in the ore which are soluble in cyanid solution. In case precious metal is contained in the solution then said solution after coming from the pulp and before going to the extractor is brought up to a strength of between one and one-half and two pounds of free alkaline cyanid to a ton of such metal-containing solution, and the metal-carrying solution of this strengh is then let into the usual zinc-precipitating cells or box, and the first action is for the copper contained in the solution to coat the zinc. The gold and silver will then deposit on the coupled copper and zinc. Then as the solution is allowed continuous flow through the precipitating-box the copper and zinc are replaced by gold and silver, and the copper and zinc are taken up by the solution and carried off in the solution as soluble salts, which are afterward precipitated in the regenerated solution, as before stated.

The accompanying drawings represent portions of a cyanid plant such as may be required for carrying on this method of treating ores.

In the drawings, 1 designates the ordinary cyanid-leaching vat; 2, the ordinary zinc-precipitator for obtaining the gold and silver; 3, the precipitating-tank, in which the cupreous cyanid solution and the acid are combined to form the cyanid copper precipitate and the hydrocyanic-acid solution.

4 designates a mixing vessel for mixing caustic lime with the hydrocyanic-acid solution decanted from the precipitating-tank 3.

5 is a sump-tank for receiving the regenerated alkaline cyanid solution, which solution will be returned by any suitable means, such as a pump, (not shown,) to the cyanid-tank 1 for repetition of the steps of the process hereinbefore just set forth.

6 designates an anode and cathode receptacle in which the mixture of copper cyanid precipitate and alkaline oxid solution are treated by electrolysis, as hereinbefore stated.

The alkaline cyanid solution which I use is the same as that ordinarily used in the cyanid process. The acid which I prefer to use for precipitating the cyanid copper precipitate is sulfuric acid, which is poured into the charge in the tank 3 in such proportion as may be necessary to produce complete precipitation of the copper, thus freeing the solution contained in the tank 3 of the copper.

The formula involved in this process when the sulfuric acid is added to the cupreous cyanid solution may be represented by the following equation:

$$CuK(CN)_3 + H_2SO_4 = CuCN + KSO_4 + (HCN)_2.$$

The alkaline caustic which I prefer to use for neutralizing the hydrocyanic-acid solution is caustic lime on account of economy at the works in which I have carried on the process. Caustic soda or other equivalents may be used at the discretion of the operator.

The formula involved when the caustic lime is combined with the hydrocyanic-acid solution in the mixer 4 may be represented by the following equation, viz:

$$HCN + CaOH = CaCN + H_2O.$$

The caustic alkaline solution which I use to mix with the copper cyanid precipitate for the reduction by electrolysis in tank 6 is a solution of caustic lime; but caustic soda might be preferable on account of its perfect solubility.

What I claim, and desire to secure by Letters Patent of the United States, is—

1. The process of treating copper ores which consists in first, subjecting the ore to the action of alkaline cyanid solution and thereby dissolving the metals which are soluble in said solution; second, treating the solution with acid and thereby producing copper cyanid precipitate and hydrocyanic-acid solution; third, separating the solution containing the hydrocyanic acid from the copper precipitate; fourth, neutralizing said hydrocyanic-acid solution with alkaline oxid thereby reproducing alkaline cyanid solution for repetition of the before-described process; and fifth, producing metallic copper, from the copper cyanid precipitate by placing the copper precipitate in a suitable receptacle together with an alkaline solution and treating the mixture by electrolysis and thereby producing metallic copper and alkaline cyanid solution.

2. The process of regenerating cyanid in the treatment of ores containing metals soluble in cyanid solution, particularly cupreous ores, which consists in first, treating the ore with sufficient alkaline cyanid solution to dissolve the metals which are soluble in cyanid solution; second, treating the solution with acid and thereby producing copper cyanid precipitate and hydrocyanic-acid solution; third, separating the solution containing the hydrocyanic acid from the copper precipitate; and fourth, neutralizing said hydrocyanic-acid solution with alkaline oxid, thereby reproducing alkaline cyanid solution ready for use in the further working of ores.

3. The method set forth which consists in treating cupreous ores containing precious metal, with a cyanid solution and thereby dissolving the precious metal and copper, then precipitating the precious metal by the aid of a zinc precipitator, and then treating the resultant cyanid solution with an acid and thereby producing copper cyanid precipitate and hydrocyanic-acid solution; then neutralizing said solution with alkaline oxid, thereby producing alkaline cyanid suitable for the further treatment of ores.

4. The method set forth which consists in treating cupreous ores containing precious metal, with a cyanid solution, thereby dissolving the precious metal and copper in such ores, then precipitating the precious metal by the aid of a zinc precipitator, and then treating the resultant cupreous cyanid solution with an acid and thereby producing copper cyanid precipitate and hydrocyanic acid.

5. The method of producing metallic copper from cupreous cyanid precipitate which consists in mixing said precipitate with an alkaline oxid solution, subjecting the mixture to electrolysis thereby obtaining the metallic copper and an alkaline cyanid solution suitable for the further treatment of ores.

6. The process of treating copper ores carrying precious metal, which consists in first, subjecting the ore to the action of alkaline cyanid solution and thereby dissolving the metals which are soluble in said solution; second, precipitating the precious metals; third, treating the solution with acid and thereby producing copper cyanid precipitate and hydrocyanic-acid solution; fourth, separating the solution containing the hydrocyanic acid from the copper precipitate; fifth, neutralizing said hydrocyanic-acid solution with alkaline oxid thereby reproducing alkaline cyanid solution for repetition of the before-described process; and sixth, producing metallic copper, from the copper cyanid precipitate by placing the copper precipitate in a suitable receptacle together with an alkaline solution and treating the mixture by electrolysis and thereby producing metallic copper and alkaline cyanid solution.

7. The process of regenerating cyanid in the treatment of ores containing metals soluble in cyanid solution, particularly cupreous ores containing precious metals, which consists in first, treating the ore with sufficient alkaline cyanid solution to dissolve the metals which are soluble in cyanid solution; second, precipitating the precious metals; third, treating the solution with acid and thereby producing copper-cyanid precipitate and hydrocyanic-acid solution; fourth, separating the solution containing the hydrocyanic acid from the copper precipitate; and fifth, neutralizing said hydrocyanic-acid solution with alkaline oxid, thereby reproducing alkaline cyanid solution ready for use in the further working of ores.

In testimony whereof I have signed my name to this specification, in the presence of two subscribing witnesses, at Los Angeles, in the county of Los Angeles and State of California, this 16th day of December, 1902.

L. E. PORTER.

Witnesses:
JAMES R. TOWNSEND,
JOHN J. SEEMAN.